(No Model.) 2 Sheets—Sheet 1.
A. L. SMITH.
GAGE FOR CENTERING LENSES AND MAKING OTHER OPTICAL MEASUREMENTS.
No. 458,922. Patented Sept. 1, 1891.
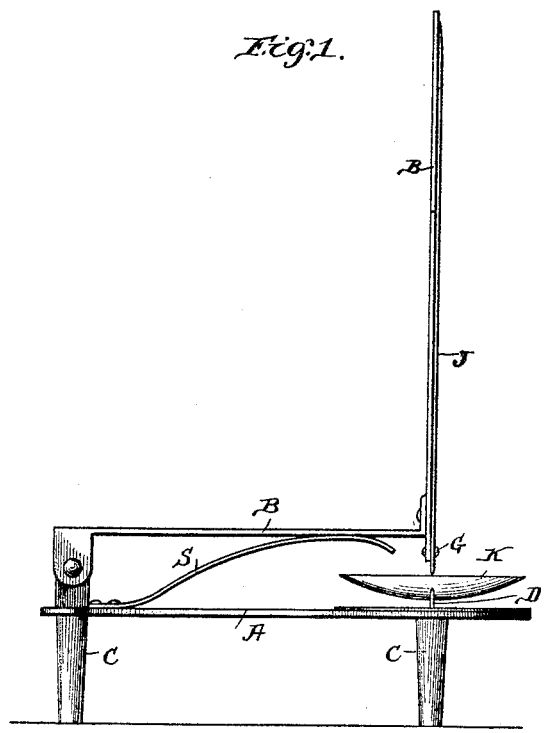
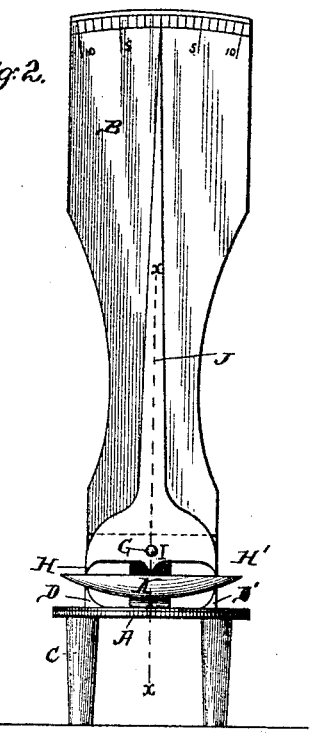
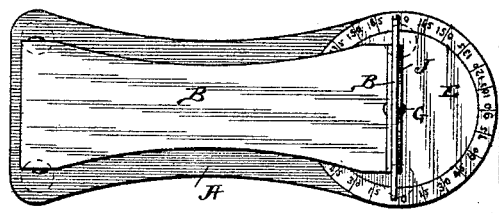
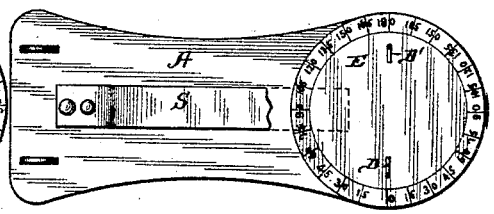
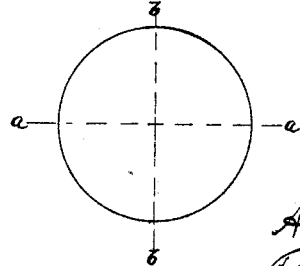
Witnesses.
Wm M. Rheem
Todd Mason
Inventor.
Andrew L. Smith
By Raymond & Veeder
Atty's (No Model.) 2 Sheets—Sheet 2.
A. L. SMITH.
GAGE FOR CENTERING LENSES AND MAKING OTHER OPTICAL MEASUREMENTS.
No. 458,922. Patented Sept. 1, 1891.
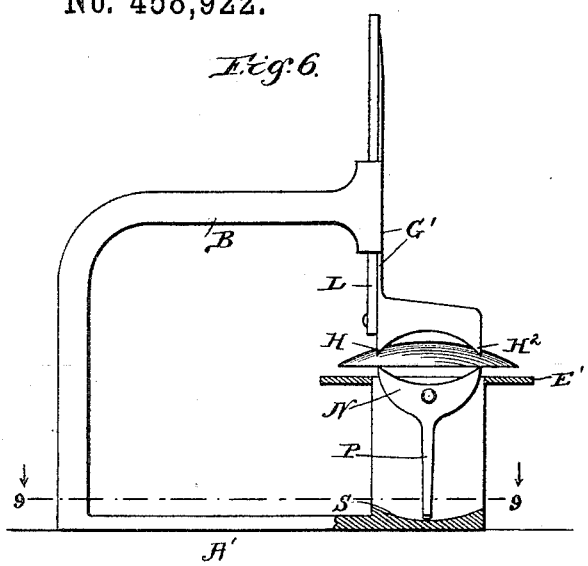
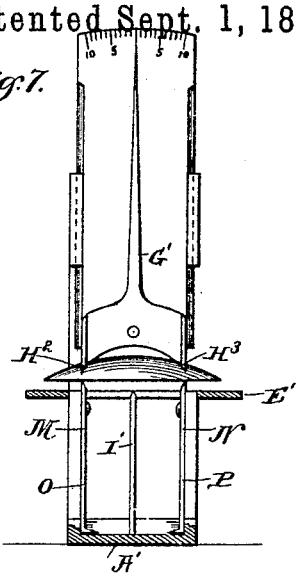
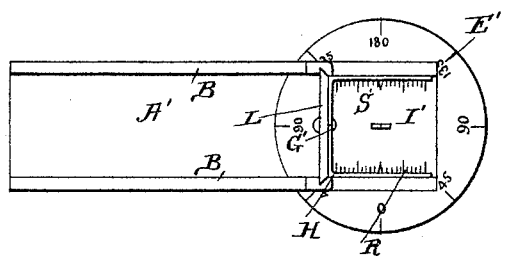
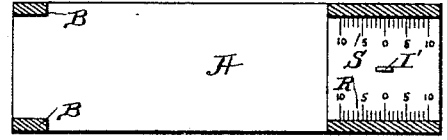
Witnesses.
Wm. M. Rheem
Todd Mason
Inventor.
Andrew L. Smith
By Raymond + Veeder
att'ys.
THE NORRIS PETERS CO., PHOTO-LITHO., WASHINGTON, D. C.

UNITED STATES PATENT OFFICE.

ANDREW L. SMITH, OF CHICAGO, ILLINOIS, ASSIGNOR TO THE GENEVA OPTICAL COMPANY, OF ILLINOIS.

GAGE FOR CENTERING LENSES AND MAKING OTHER OPTICAL MEASUREMENTS.

SPECIFICATION forming part of Letters Patent No. 458,922, dated September 1, 1891.

Application filed March 25, 1891. Serial No. 386,302. (No model.)

*To all whom it may concern:*

Be it known that I, ANDREW L. SMITH, residing at Chicago, in the county of Cook and State of Illinois, and a citizen of the United States, have invented certain new and useful Improvements in Gages for Centering Lenses and Making other Optical Measurements, of which the following is a specification.

The device described and shown herein is based on the fact that the thicknesses of a lens taken at several points symmetrically located with reference to its center or axis are equal and planes cutting the lens upon its opposite sides and passing through these points are parallel. Its main elements are two or more series of contact-points, which may be designated as "opposed," because they act on the opposite sides of the lens, one series of said points being movable relatively to the other and one or both series having indicating devices whereby the parallelism or inclination of the planes of said series of points is registered.

The device when provided with a center indicating-point is adapted not only for ascertaining the centers of lenses, but also, by means of the indicating devices first referred to, adapted for measuring the angles of prisms and for determining the axes of cylindrical lenses and for other similar purposes of the optician, as will hereinafter appear.

In the accompanying drawings, Figure 1 is a side elevation, and Fig. 2 is an end elevation, of a simple form of device embodying my invention. Figs. 3 and 4 are plan views of the same, the upper portion of the device being removed in Fig. 4, so as to show the base of the instrument more clearly; and Fig. 5 is a view of the lens, illustrating the manner in which it is centered by the instrument. Figs. 6 to 9 show a more elaborate and complete form of the instrument by which the lens may be centered in a single operation. Fig. 6 is a side view, partially in section. Fig. 7 is an end view, also partially in section. Fig. 8 is a plan, and Fig. 9 is a horizontal section on line 9 9 of Fig. 6.

The mounting or frame of the device, as shown in the first form, consists of two principal parts: a base A and a hinged sliding or torsion bracket B. The base is supported upon suitable legs C, and upon its upper surface near one end are fixed two studs or pins D D', whose upper ends are pointed, (or are otherwise suitably shaped for the lens,) and on said upper surface is a circular dial E, whose center is at a point midway between the contact-points of the studs D D'. A spring S is used as a matter of convenience for supporting the bracket B with a yielding pressure. The bracket B is hinged to the opposite end of the base A, and its upright portion forms a sectional dial whose graduations are shown in Fig. 2 at the upper portion of said bracket.

Pivoted at F to the lower portion or upright face of the bracket B is a lever G, provided with contact-points H H' opposite to the contact-points of the studs D D'. Midway between the contact-points H H' is an indicating-point I. Attached to or forming part of the lever G is an index or pointer J, extending over the graduations on the face of the bracket B, heretofore referred to. The contact-points H H' are so situated with reference to the contact-points of the studs D D' that when the distance between the points H and D is equal to the distance between the points H' D', so that parallel planes could be passed through the points H H' and D D', respectively, the index J will stand at zero, while the movement of the lever G upon its pivot F, so as to destroy the equality of the distance between the points H D and D' H', will be measured by the reading of the index J upon its dial. In the drawings the points H H' are equidistant and the contact-points of D D' are equidistant from a central line X X, which is common to both H H' and D D' when the index J stands at zero, as shown in Fig. 2, and the point I lies in the said central line, which will coincide with the center of the lens; but it is only necessary to the operation of the device that the points H H' and the contact-points of D D' shall be when in parallel planes symmetrically arranged with reference to said common central line, the distance of the points H and H' not being necessarily the same as the distance of the contact-points D D' from their common central line.

The operation of the device in ascertaining the center of a lens, as K, may be seen in Figs. 1 and 2. The lens is inserted between the contact-points H D and H' D', so that the plane of the points H D H' D' shall bisect the lens as nearly as the eye can determine, and the lens is then shifted sidewise until the pointer J stands at zero. Its center will then be indicated by the point I—that is to say, the center will lie in a line $a\,a$, Fig. 5, passing immediately beneath the point I at right angles to the plane of the contact-points H D H' D'. The point upon the lens immediately beneath the point I may be marked in any suitable manner, and the lens is then revolved ninety degrees, approximately, so that the imaginary line $a\,a$, Fig. 5, will be brought in the plane of the contact-points and is again centered. Thus a point in the imaginary line $b\,b$, Fig. 5, passing through the center of the lens is ascertained. If this point coincides with the point of the line $a\,a$ first ascertained, the center of the lens is determined. If the second point ascertained does not coincide with the first, the first must be shifted along the line $a\,a$ until a coincidence is secured, and one or two trials, which can be almost instantly made, will be sufficient to accurately center the lens, as a close approximation can be secured by the first centering; but in order to accurately center the lens at a single trial I prefer the device shown in Figs. 6 to 9, inclusive, which device is also specially adapted for ascertaining the axis of a cylindrical lens. The measurement of the angle of a prism can be made at a single movement by placing it between the contact-points and revolving it about the center I slightly, so as to ascertain the maximum reading of the pointer J. The movement so imparted to the lever G and its contact-points will destroy the equality of the distance of the points H H' from the center line X X, Fig. 2; but the accuracy of the measurement of the angle of the prism will not be affected thereby, as the spacing of the degrees upon the scale of the pointer J may be properly adjusted to give the true readings. To ascertain the axis of a cylindrical lens with this device, the lens is rotated until a position is found which permits the lens to be moved from side to side in the direction of the line joining the contact-points without moving the index J from zero. The position of the axis of said lens can be marked in any suitable manner, and the graduated scale E will enable it to be marked so that the axis can be placed at any desired angle in the spectacle-frame.

Referring to the more elaborate form of instrument shown in Figs. 6 to 9, inclusive, the two parts of the frame, consisting of the base A' and the arm or bracket B', are rigidly joined and may be made of a single casting. In the face of the bracket B' is a groove having fitted therein a slide L, to which the lever G' is pivoted. Said lever G' differs from the lever G heretofore described in having four contact-points H H' $H^2$ $H^3$ instead of two, said points being arranged symmetrically around the point I', which indicates the center of the lens. The lower series of bearing-points opposed to the points H H' $H^2$ $H^3$ are formed upon two pivoted levers M N, the points of said levers being likewise symmetrically arranged in reference to the central point I'. The plane of their pivotal points is at right angles to the plane of the pivot of the lever G'. Each lever M N is provided with a pointer moving over a graduated scale at the base of the instrument, and when the planes of the contact-points of the levers M N coincide and their indexes stand at zero upon their respective scales said plane would be parallel to the plane of the contact-points H H' $H^2$ $H^3$ when the index of the lever G' stands at zero. Thus, if a spherical lens, either convex or concave, be placed in the instrument so as to make contact with all the points and all three indexes stand at zero the point I' will be opposite the center of the lens. If a cylindrical lens be placed upon the contact-points of the lever M N, its axis will be parallel to the plane of the pivots of said levers when their indexes stand at zero. The position of the axis of the lens can be determined most accurately. A circular scale E', whose purpose is the same as that of the scale E, described in connection with the first form of the instrument is, provided.

It is obvious that in connection with the pivoted levers M N a lever G, having a single pair of opposed bearing-points—such as are used in connection with the first form of the instrument—may be substituted for the lever G', having four bearing-points, it being only necessary that said single pair of points should be located symmetrically with reference to the central point I' and the points of the levers M N.

The operation of measuring the angle of a prism with the device last described is practically the same as with the first-described form and needs no further description.

What I claim as new, and desire to secure by Letters Patent, is as follows:

1. The combination, in an instrument of the character described, of a series of bearing-points, and a lever having a series of contact-points opposed to said bearing-points, and an index or pointer connected to said lever and indicating upon a suitable graduated scale the relative inclination of the respective planes of said several series of points, substantially as described.

2. The combination, in an instrument of the character described, of a series of bearing-points, and a lever having contact-points opposed to said bearing-points, and an index or pointer connected to said lever and indicating upon a suitable graduated scale the relative inclination of the respective planes of said several opposed series of points, and an indicating-point situated midway between the lever contact-points, substantially as described.

3. The combination, in an instrument of the character described, of bearing-points, and a lever having contact-points opposed to said first-named points, and an index or pointer connected to said lever and indicating upon a suitable graduated scale the relative inclination of the planes of said opposed series of points, and an indicating-point situated midway between said bearing-points, substantially as described.

4. The combination, in an instrument of the character described, of bearing-points, and a lever having contact-points opposed to said first-named points, and an index or pointer connected to said lever and indicating upon a suitable scale the relative inclination of the respective planes of said opposed points, and a graduated dial whose center is located at the center of one of said series of points, substantially as described.

5. The combination, in an instrument of the character described, of a series of bearing-points formed upon a lever or levers, and an opposed series of bearing-points formed upon a lever or levers, and devices connected to said levers, whereby the relative inclination of the respective planes of said opposed series of bearing-points are indicated, substantially as described.

6. The combination, in an instrument of the character described, of a series of bearing-points formed upon a lever or levers and an opposed series of bearing-points formed upon a lever or levers, the plane of the axis of the said last-named lever being at right angles to the plane of the axis of the first-named series of levers, substantially as described.

7. The combination, in an instrument of the character described, of levers, as M N, having bearing or contact points, actuating indexes or pointers, and scales graduated to show the coincidence or inclination of said points with a single plane, substantially as described.

ANDREW L. SMITH.

Witnesses:
 IRWIN VEEDER,
 TODD MASON.